(12) United States Patent
Wu et al.

(10) Patent No.: US 8,538,967 B1
(45) Date of Patent: Sep. 17, 2013

(54) OPTIMIZING RECATEGORIZATION OF FINANCIAL TRANSACTIONS USING COLLABORATIVE FILTERING

(75) Inventors: David Junzi Wu, Stanford, CA (US); Levon Budagyan, Mountain View, CA (US); Marko Rukonic, San Jose, CA (US)

(73) Assignee: Intuit Inc., Mountain View, CA (US)

( * ) Notice: Subject to any disclaimer, the term of this patent is extended or adjusted under 35 U.S.C. 154(b) by 233 days.

(21) Appl. No.: 13/005,462

(22) Filed: Jan. 12, 2011

(51) Int. Cl.
*G06F 17/30* (2006.01)

(52) U.S. Cl.
USPC .......................................... 707/737

(58) Field of Classification Search
None
See application file for complete search history.

(56) References Cited

U.S. PATENT DOCUMENTS

| | | | | |
|---|---|---|---|---|
| 6,064,980 A * | 5/2000 | Jacobi et al. | ................. | 705/26.7 |
| 6,792,422 B1 * | 9/2004 | Stride et al. | ................. | 707/693 |
| 7,840,457 B2 * | 11/2010 | Rukonic et al. | ................. | 705/30 |
| 7,966,329 B1 * | 6/2011 | Rukonic et al. | ................. | 707/737 |
| 8,060,423 B1 * | 11/2011 | Rukonic et al. | ................. | 705/35 |
| 2004/0019651 A1 * | 1/2004 | Andaker | ................. | 709/207 |
| 2004/0034612 A1 * | 2/2004 | Mathewson et al. | ................. | 706/46 |
| 2005/0131859 A1 * | 6/2005 | Li | ................. | 707/1 |
| 2006/0224558 A1 * | 10/2006 | Flora et al. | ................. | 707/1 |
| 2007/0027861 A1 * | 2/2007 | Huentelman et al. | ................. | 707/5 |
| 2007/0094217 A1 * | 4/2007 | Ronnewinkel | ................. | 706/52 |
| 2007/0118802 A1 * | 5/2007 | Gerace et al. | ................. | 715/738 |
| 2008/0118802 A1 * | 5/2008 | Szrama et al. | ................. | 429/30 |
| 2008/0300958 A1 * | 12/2008 | Gluck | ................. | 705/10 |
| 2009/0037461 A1 * | 2/2009 | Rukonic et al. | ................. | 707/103 R |
| 2009/0210442 A1 * | 8/2009 | Klimczak | ................. | 707/102 |
| 2009/0222365 A1 * | 9/2009 | McGlynn et al. | ................. | 705/30 |
| 2009/0276346 A1 * | 11/2009 | Rukonic et al. | ................. | 705/35 |
| 2010/0037299 A1 * | 2/2010 | Karasick et al. | ................. | 726/4 |
| 2010/0153242 A1 * | 6/2010 | Preston et al. | ................. | 705/30 |
| 2010/0325113 A1 * | 12/2010 | Valeski | ................. | 707/740 |

* cited by examiner

*Primary Examiner* — Fred I Ehichioya
*Assistant Examiner* — Richard Bowen
(74) *Attorney, Agent, or Firm* — Osha Liang LLP

(57) ABSTRACT

A method to optimize recategorization of financial transactions using collaborative filtering involves obtaining a set of financial transactions of a set of users with a merchant. The method also involves determining, using a processor, a first portion of the set of financial transactions assigned to each recategorization value of a set of recategorization values; determining, using the processor, a second portion of the set of financial transactions where the each recategorization value is different from an initial category; generating, using the processor, a recategorization index for each recategorization value using the first portion of each recategorization value and the second portion; and determining, using the processor, an alternative categorization candidate based on the recategorization index of the each recategorization value.

22 Claims, 6 Drawing Sheets

OPTIMIZING RECATEGORIZATION OF FINANCIAL TRANSACTIONS USING COLLABORATIVE FILTERING

BACKGROUND

Many consumers monitor their spending habits with merchants using financial applications. The financial applications may store records of financial transactions with the merchants. A consumer may use a financial application to filter and review the financial transactions to make decisions about the consumer's budget. For example, the consumer may use the financial application to analyze the consumer's spending habits in view of his income.

Typically, a consumer categorizes the financial transactions stored in the financial application to allow the consumer to perform analysis based on the categorization of financial transactions. In this case, categorized financial transactions may be used to generate reports with summarized financial data based on the categories, allowing the consumer to allocate funds to particular categories.

In some cases, financial applications attempt to automatically categorize financial transactions based on the name of the merchants. If a category is incorrectly assigned to a merchant, a consumer may recategorize the financial transaction manually. Further, the financial application may remember the consumer's recategorization and apply the same recategorization for future financial transactions of the consumer with the same merchant.

SUMMARY

In general, in one or more aspects, the invention relates to a method for optimizing recategorization of financial transactions using collaborative filtering, comprising: obtaining a plurality of financial transactions of a plurality of users with a merchant, each of the plurality of financial transactions comprising user identification for one of the plurality of users, a merchant name of the merchant, an initial category assigned to each of the plurality of financial transactions, and a recategorization value of a plurality of recategorization values for each of the plurality of financial transactions; determining, using a processor, a first portion of the plurality of financial transactions assigned to each recategorization value of the plurality of recategorization values; determining, using the processor, a second portion of the plurality of financial transactions where the each recategorization value is different from the initial category; generating, using the processor, a recategorization index for the each recategorization value using the first portion of the each recategorization value and the second portion; and determining, using the processor, an alternative categorization candidate based on the recategorization index of the each recategorization value.

In general, in one or more aspects, the invention relates to a system for optimizing recategorization of financial transactions using collaborative filtering, comprising: a processor; a memory; an application interface stored on the memory for executing on the processor and configured to: obtain a plurality of financial transactions of a plurality of users with a merchant, each of the plurality of financial transactions comprising user identification for one of the plurality of users, a merchant name of the merchant, an initial category assigned to each of the plurality of financial transactions, and a recategorization value of a plurality of recategorization values for each of the plurality of financial transactions; and a recategorization optimization module stored on the memory for executing on the processor and configured to: determine a first portion of the plurality of financial transactions assigned to each recategorization value of the plurality of recategorization values; determine a second portion of the plurality of financial transactions where the each recategorization value is different from the initial category; generate a recategorization index for the each recategorization value using the first portion of the each recategorization value and the second portion; and determine an alternative categorization candidate based on the recategorization index of the each recategorization value.

In general, in one or more aspects, the invention relates to a computer readable storage medium, embodying instructions executable by the computer to perform method steps for optimizing recategorization of financial transactions using collaborative filtering, the instructions comprising functionality to: obtain a plurality of financial transactions of a plurality of users with a merchant, each of the plurality of financial transactions comprising user identification for one of the plurality of users, a merchant name of the merchant, an initial category assigned to each of the plurality of financial transactions, and a recategorization value of a plurality of recategorization values for each of the plurality of financial transactions; determine a first portion of the plurality of financial transactions assigned to each recategorization value of the plurality of recategorization values; determine a second portion of the plurality of financial transactions where the each recategorization value is different from the initial category; generate a recategorization index for the each recategorization value using the first portion of the each recategorization value and the second portion; and determine an alternative categorization candidate based on the recategorization index of the each recategorization value.

Other aspects of the invention will be apparent from the following description and the appended claims.

DETAILED DESCRIPTION

Figure 1:
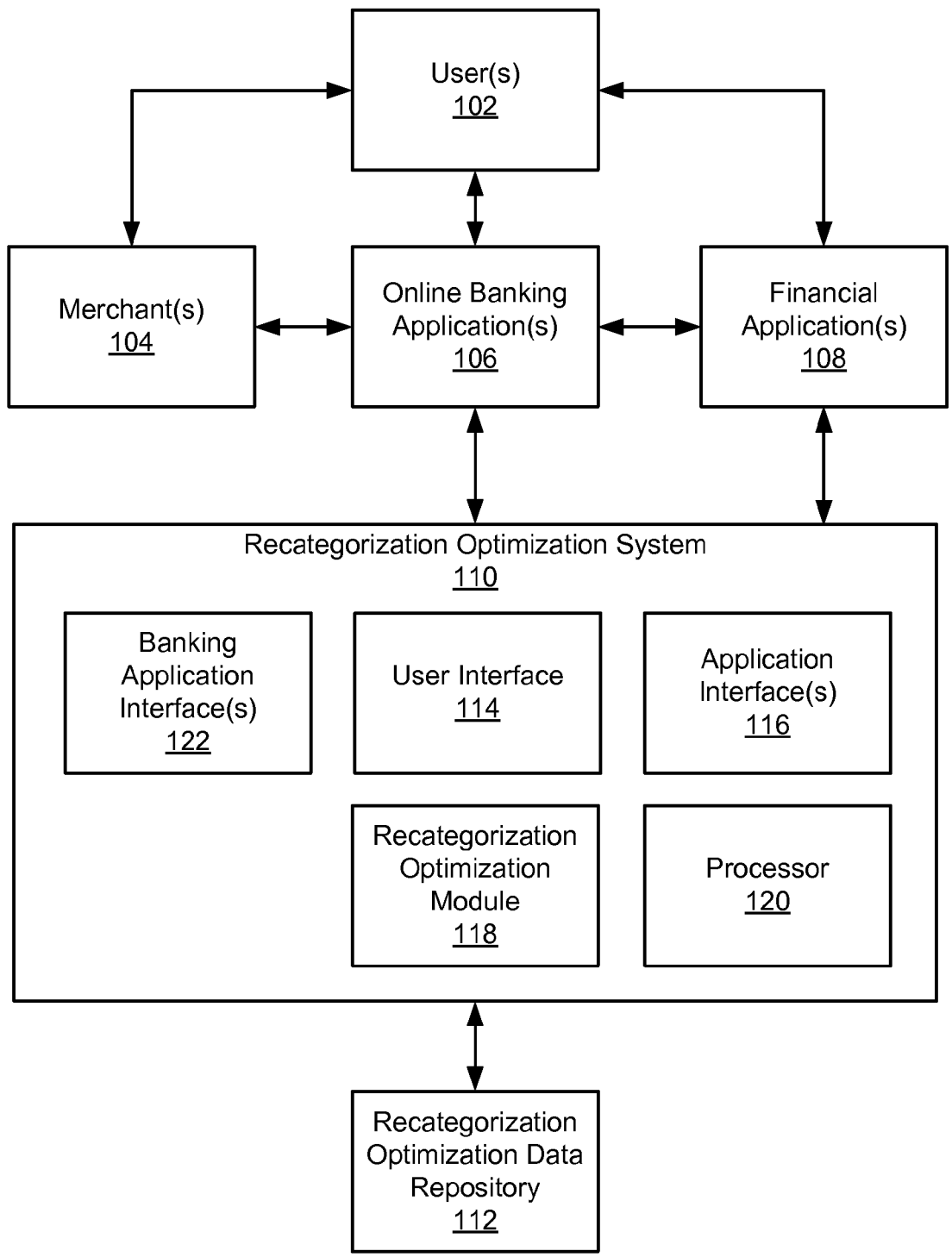
FIG. 1 shows a schematic diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for optimizing recategorization of financial transactions using collaborative filtering. More specifically, embodiments of the invention provide a method and system to obtain and analyze categorization and recategorization data from financial applications of a user community. Further, the analysis of the data from the user community is used to calculate alternative categories for financial transactions that are presented to users of the financial applications.

FIG. 1 shows a system for optimizing recategorization of financial transactions using collaborative filtering in accordance with one or more embodiments of the invention. The system includes a recategorization optimization system (110) interacting with merchant(s) (104), financial application(s) (108), and recategorization optimization data repository (112). Optionally, the recategorization optimization system (110) may also interact with online banking application(s) (106). The recategorization optimization system (110) further includes a user interface (114), application interface(s) (116), a recategorization optimization module (118), and a processor (120), which are each operatively connected to the recategorization optimization system (110). Optionally, the recategorization optimization system (110) further includes banking application interface(s) (122). Each of these components is described with respect FIG. 1 below. One of ordinary skill in the art will appreciate that embodiments of the invention are not limited to the configuration shown in FIG. 1.

In one or more embodiments of the invention, the financial application(s) (108) are configured to interact with the recategorization optimization system (110). More specifically, the financial application(s) (108) may be, or may contain a form of, an internet-based communication device that is capable of communicating with the recategorization optimization system (110). The financial application(s) (108) may be executed on, for example, a desktop computer with internet access, a laptop computer with internet access, a smart phone, and a personal digital assistant (PDA).

In one or more embodiments of the invention, the financial application(s) (108) may be operated by the user(s) (102), which may include, but are not limited to, an individual, a group, an organization, or some other legal entity. Optionally, the financial application(s) (108) may interact directly with online banking application(s) (106). For example, in some embodiments, the financial application(s) (108) obtain financial transaction data from the online banking application(s) (106).

In one or more embodiments of the invention, the user(s) (102) may participate in financial transactions with merchant(s) (104) to purchase goods and/or services. The user(s) (102) may be members of a user community that use related financial application(s) (108) for managing financial transactions. For example, the user(s) (102) may be a group of consumers that use the financial application(s) (108) for budget management. The merchant(s) (104) may be any entity capable of providing goods and/or services to the user(s) (102). Examples of merchant(s) (104) may include, but are not limited to, a retailer at a point of sale, an online retailer, a service provider, etc. In one or more embodiments of the invention, the merchant(s) (104) accept payment from the user(s) (102) in exchange for the goods and/or services.

In one or more embodiments of the invention, online banking application(s) (106) are configured to monitor the financial transactions of the user(s) (102) with the merchant(s) (104). More specifically, the online banking application(s) (106) may receive financial transactions from the user(s) (102) and/or merchant(s) (104). Examples of data related to the financial transactions may include, but are not limited to, merchant name, transaction date, transaction amount, etc.

In one or more embodiments of the invention, the financial application(s) (108) are configured to obtain financial transactions from the online banking application(s) (106) and/or the user(s) (102). For example, the financial application(s) (108) may be configured to receive financial transactions from the online banking application(s) (106) on a periodic basis. In this example, the financial application(s) (108) may be configured to store login credentials of the user(s) (102) for accessing the online banking application(s) (106).

In one or more embodiments of the invention, the recategorization optimization system (110) is configured to obtain financial data from the financial application(s) (108) and/or the online banking application(s) (106). Specifically, the recategorization optimization system (110) may be configured to obtain financial transactions, categorization data, and/or recategorization data from the financial application(s) (108) using application interface(s) (116). The application interface(s) (116) may support a variety of protocols of different financial applications (108) (e.g., desktop financial application, web financial application, mobile web application, etc.). Further, the categorization data and recategorization data is related to the merchant(s) (104) of the financial transactions. For example, a merchant (104) selling clothing in a financial transaction may be categorized as participating in a "shopping" financial transaction. In another example, an electric provider acting as a merchant (104) may be categorized as participating in a "utilities" financial transaction. Those skilled in the art will appreciate that any number of categories may be used by user(s) (102) to categorize and recategorize merchants (104) participating in financial transactions.

Optionally, in one or more embodiments of the invention, the recategorization optimization system (110) may also be configured to obtain financial transactions from the online banking application(s) (106) using the banking application interface(s) (122). The banking application interface(s) (116) may support a variety of protocols for online banking application(s) (106) of different financial institutions.

In one or more embodiments of the invention, the recategorization optimization system (110) is configured to store categorization information in the categorization optimization data repository (112). Categorizations information may include data about the categorizing and recategorizing of financial transactions. The stored categorization information may include a number of fields including, but are not limited to, a user identifier, a merchant name, a categorization value, and a recategorization value. The recategorization optimization system (110) may be configured to monitor the optimization data repository (112) for categorization information. The categorization information may come from a variety of sources including, but not limited to, the financial application(s) (108), the online banking application(s) (106), other sources, or a combination thereof.

In one or more embodiments of the invention, the processor (120) within the recategorization optimization system (110) is configured to execute one or more components of the recategorization optimization system (110). Specifically, the processor (120) may be configured to execute the recategorization optimization module (118) or any of the engines, modules, generators, and repositories of the recategorization optimization system (110). The processor (120) may be an integrated circuit, a central processing unit, a multi-core processing chip, a multi-chip module including multiple multi-core processing chips, or other hardware processor. Those skilled in the art will appreciate that the processor (120) may be known by other names, including but not limited to a computer processor, a microprocessor, a hardware processor, and a multi-core processor. In one or more embodiments of the invention, the processor (120) is configured to execute software instructions stored in memory (not shown). The memory may include one or more cache memories, main memory, and/or any other suitable type of memory. The memory may be discretely located on the purchased item data processing unit (110) relative to the processor (120). In certain configurations, the memory may also be integrated with the processor (120).

In one or more embodiments of the invention, the recategorization optimization system (110) may be configured to analyze financial data using the recategorization optimization module (118). More specifically, the recategorization optimization system (110) may be configured to determine alternative categorizations for financial transactions in the financial data. The analysis of financial data by the recategorization optimization system (110) is discussed in detail with respect to FIG. 2 below.

In one or more embodiments of the invention, the recategorization optimization system (110) is configured to receive a request from the financial application(s) (108) for alternative categorizations for financial transactions. More specifically, the application interface(s) (116) is configured to receive and process requests from the financial application(s) (108). For example, a financial application (108) may send a request for alternative categories of a merchant (104) to the recategorization optimization system (110) when a user (102) is reviewing a record of a financial transaction with the merchant. Those skilled in the art will appreciate that a variety of financial application(s) (108) may be supported by the application interface(s) (116). In this case, the application interface(s) (116) may provide one or more application programming interfaces ("API") that may be used by different financial applications (108) (e.g., desktop financial application, web financial application, mobile financial application, etc.).

In one embodiment of the invention, the recategorization optimization data repository (112) is a persistent storage device (or set of devices) and is configured to store the financial transaction, categorization information, etc. Examples of a recategorization optimization data repository (112) include, but are not limited to, a data base, a file system, a hard drive, some other form of data storage, or any suitable combination thereof.

In one or more embodiments of the invention, the user interface (114) is configured to interact with administrators of the recategorization optimization system (110). More specifically, the user interface (114) may be configured to receive requests from an administrator to analyze financial data to generate recategorization indexes. The user interface (114) may include a keypad, a keyboard, a touch screen, a mouse, a voice-activated interface, some other means of interacting with the user, or any suitable combination thereof.

Those skilled in the art will appreciate that the aforementioned components may be located on a single system or distributed across multiple systems. Further, in embodiments in which the components are distributed across multiple systems, the distributed components may communicate over wired and/or wireless connections using well known communication protocols.

Figure 2:
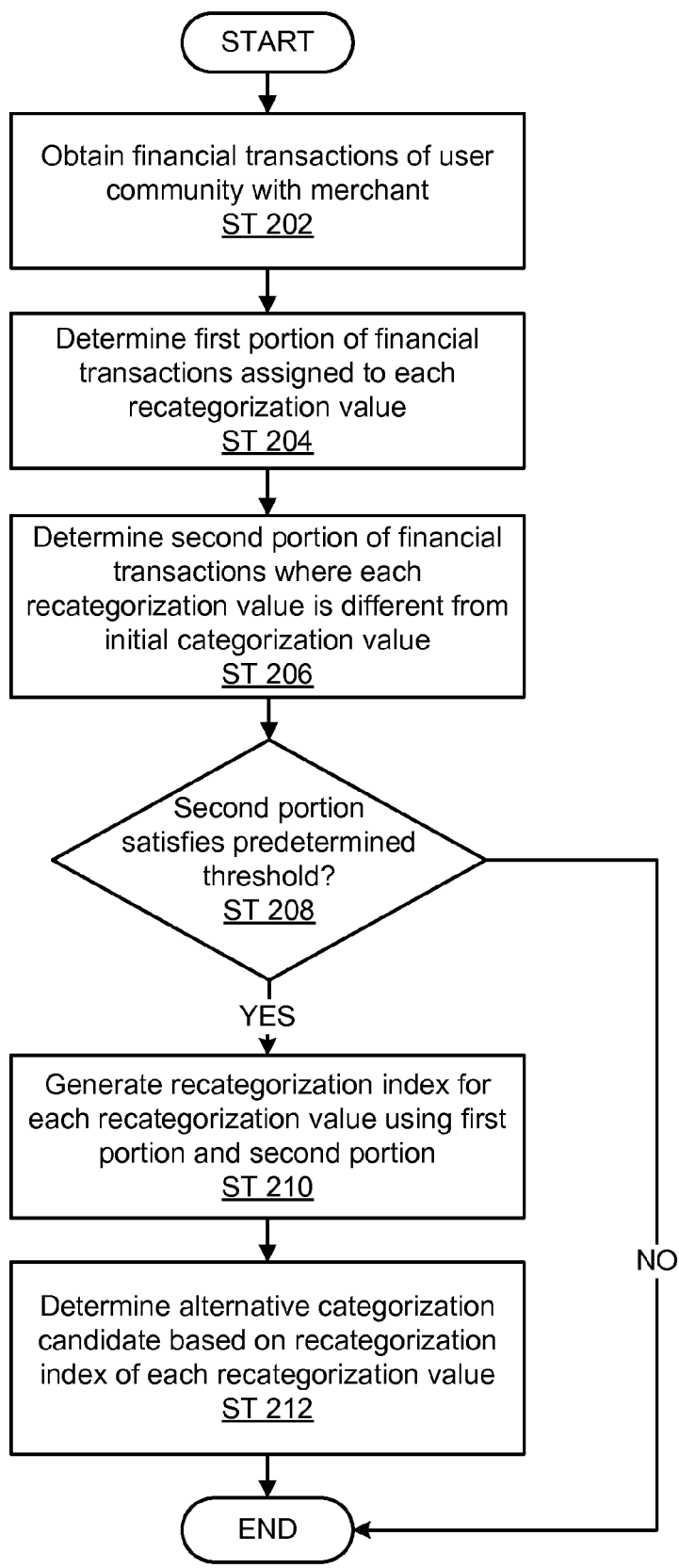
FIG. 2 shows a flowchart for optimizing recategorization of financial transactions using collaborative filtering.

FIG. 2 show a flow chart for optimizing recategorization of financial transactions using collaborative filtering in accordance with one or more embodiments of the invention. One or more of the steps shown in FIG. 2 may be omitted, repeated, and/or performed in a different order than that shown in FIG. 2. In addition, a person of ordinary skill in the art will appreciate that other steps, omitted in FIG. 2, may be included in one or more of these flowcharts. Accordingly, the specific arrangement of steps shown in FIG. 2 should not be construed as limiting the scope of the invention.

In Step 202, financial transactions of member(s) of a user community with a merchant are obtained. More specifically, categorization and recategorization data for the financial transactions may be obtained from financial applications of the members of the user community. In this case, the categorization and recategorization data may include user identification information, merchant information, categorization values, and recategorization values. In one or more embodiments of the invention, the categorization and recategorization data is initially obtained when the members review and categorize financial transactions managed by the financial applications. For example, a member of the user community may review financial transactions of a credit card and categorize each of the financial transactions when managing the member's budget with the financial application. In this example, the financial application may monitor the categorizations and recategorizations of financial transactions performed by the user. Prior to providing the financial transactions, the financial applications may conceal personal information of the members to ensure that the privacy of the members are protected. For example, the financial transactions may be associated with random unique identifiers that cannot be traced back to the members.

In Step 204, a first portion of the financial transactions that is assigned to each recategorization value is determined. Each first portion includes financial transactions that have been assigned to a corresponding recategorization value by a number of members in the user community. Further, the first portion may be limited to only include financial transactions where the recategorization value is different from the initial categorization value. The initial categorization value may be a category (e.g., shopping, utilities, business, etc.) initially assigned by a user or automatically assigned by a financial application to the merchant of a financial transaction. The recategorization value may be a category (e.g., shopping, utilities, business, etc.) subsequently assigned when the initial categorization value is determined to be incorrect by the member or financial application.

In Step 206, a second portion of the financial transactions that are associated with a recategorization value that is different from the initial categorization value is identified. In other words, the second portion includes all financial transactions that have been recategorized to a different category.

In Step 208, a determination is made as to whether the second portion satisfies a predetermined threshold. The predetermined threshold may ensure that the set of financial transactions analyzed is sufficiently large enough to be statistically significant. In other words, the determination ensures that a certain quantity of financial transactions has been recategorized. For example, the predetermined threshold may be satisfied when at least five percent of all financial transactions have been recategorized.

In Step 210, a recategorization index is generated for each unique recategorization value using the first portion and the second portion. For example, the recategorization index may be calculated using Equation (1) below:

$$RI_i = \frac{\text{count}(RC_i)}{\text{count}(\text{all } RC \text{ where } RC\mathrel{!}= C1 \text{ and } RC\mathrel{!}= \text{null})} \quad (1)$$

Where $RI_i$ is the recategorization index for each recategorization value, $RC_i$ are the recategorization values grouped by category (i.e., the count of financial categories for each distinct recategorization value), RC are the recategorization values of all the financial transactions, and C1 is the corresponding initial categorization value of each financial transaction. In this example, the recategorization index of each distinct recategorization value is the ratio of financial transactions of the distinct recategorization value to all financial transactions that have been recategorized to a different category.

In Step 212, an alternative categorization candidate is determined based on the recategorization index of each distinct recategorization value. In the example of recategorization indexes calculated using Equation (1) above, the alternative categorization candidate is the recategorization value with the highest recategorization index. In one or more embodiments of the invention, multiple alternative categorization candidates may be determined and ranked based on the recategorization indexes. For example, a categorization index specifying a candidate rank greater than or equal to 0.5 may correspond to a strong candidate, a candidate rank greater than or equal to 0.3 and less than 0.5 may correspond to a potential candidate, and a candidate rank less than 0.3 may correspond to random noise. In this example, a categorization index specifying a candidate rank of random noise may excluded the corresponding categorization value from being determined as an alternative categorization.

In one or more embodiments of the invention, the alternative categorization candidates may be provided in an ordered list for selection by the member or the financial application. In this case, the ordered list of alternative categorizations may be determined by sorting the recategorization values based on the recategorization indexes. For example, the recategorization values may be sorted in a drop-down user interface element from highest to lowest recategorization index. In this example, the first recategorization value in the drop-down user interface element is provided as the primary alternative categorization candidate.

In one or more embodiments of the invention, a financial application may use alternative categorization candidates to improve existing rules for automatically categorizing financial transactions. For example, the financial application may automatically assign an improper category to a financial transaction obtained in Step 204. In this case, the alternative categorization candidates may be used to update a rule of the financial application so that future categorizations of financial transactions with the merchant are automatically assigned a strong alternative categorization candidate.

Figure 3:
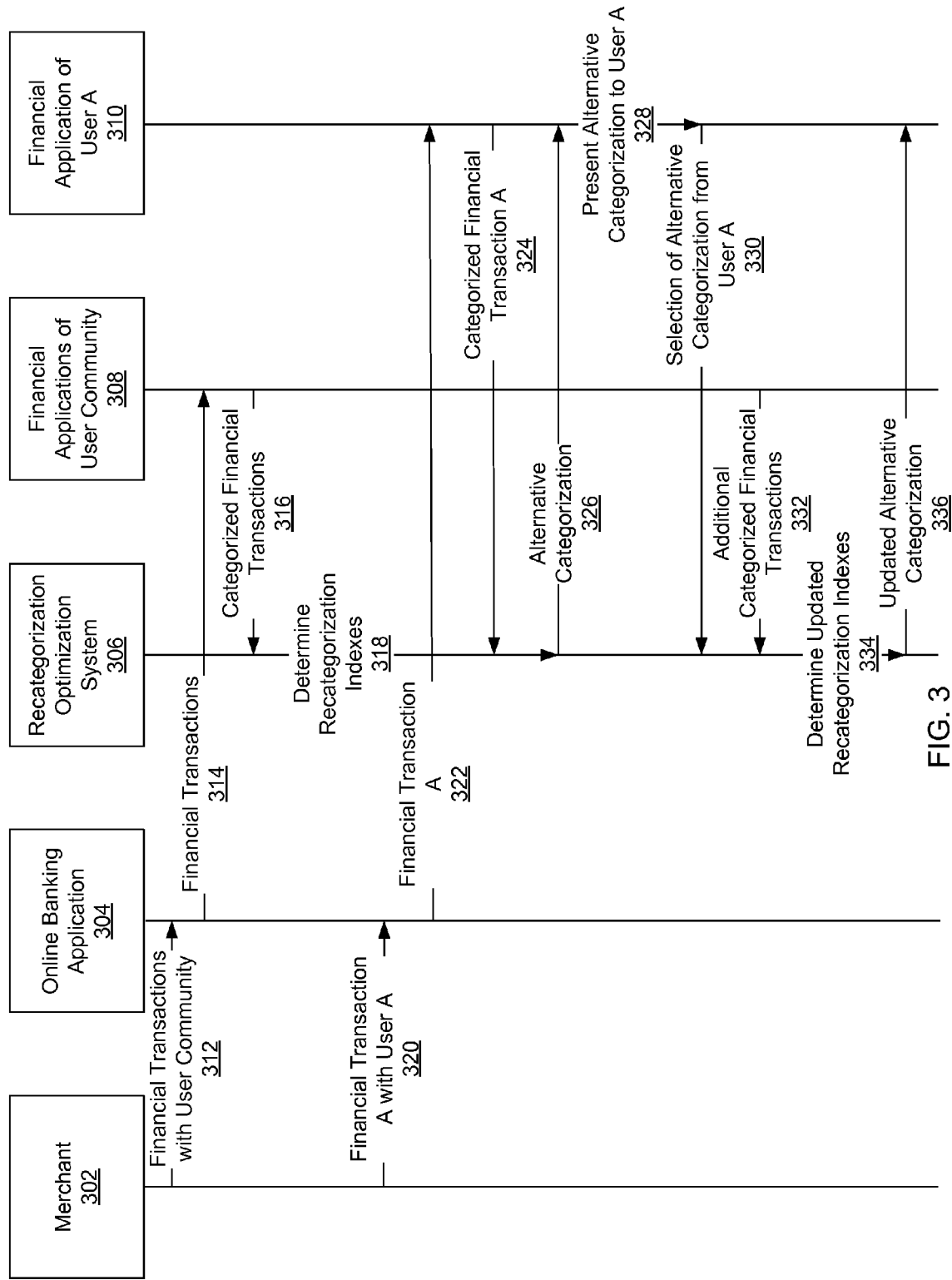
FIG. 3 shows an example of optimizing recategorization of financial transactions using collaborative filtering in accordance with one or more embodiments of the invention.

FIG. 3 shows a flow chart for optimizing recategorization of financial transactions using collaborative filtering in accordance with one or more embodiments of the invention. One or more of the steps shown in FIG. 3 may be omitted, repeated, and/or performed in a different order than that shown in FIG. 3. In addition, a person of ordinary skill in the art will appreciate that other steps, omitted in FIG. 3, may be included in one or more of these flowcharts. Accordingly, the specific arrangement of steps shown in FIG. 3 should not be construed as limiting the scope of the invention.

In Step 312, financial transactions of members in the user community are transmitted from the merchant (302) to the online banking application (304). Each of the financial transactions is associated with the merchant and a member of the user community. For example, the merchant (302) may be an online retailer, where the financial transactions are online purchases by the members of the user community. In another example, the merchant (302) may be a retailer at a point of sale, where the financial transactions are purchases by the members of the user community at a brick and mortar store.

In Step 314, the financial transactions are transmitted from the online banking application (304) to financial applications of the user community (308). Specifically, financial transactions associated with each member of the user community are transmitted to a corresponding financial application of the member. The financial application may be configured to monitor financial transactions for managing the budget of the member. The financial application may present the financial transactions and request that the member categorize financial transactions (i.e., provide categorization data). Further, the member may also recategorize financial transactions that were initial categorized in the wrong category (i.e., provide recategorization data).

Those skilled in the art will appreciate that each member of the user community may configure the member's corresponding financial application to periodically obtain financial transactions from the online banking application. In this case, each member may store the member's login credentials for use by the member's financial application.

In Step 316, categorized financial transactions are transmitted from the financial applications of the user community (308) to the recategorization optimization system (308). Categorized financial transactions are obtained from a financial application of each member of the user community. In this example, at least one of the financial transactions from each of the financial applications is associated with the merchant (302).

In Step 318, recategorization indexes are determined based on the categorized financial transactions. More specifically, a recategorization index may be calculated using the categorization data and recategorization data provided by the members of the user community as discussed above with respect to FIG. 2.

In Step 320, financial transaction A with user A is transmitted from the merchant (302) to the online banking application (304). As discussed above, financial transaction A of user A may be, for example, an online purchase or a purchase from a brick and mortar store.

In Step 322, financial transaction A is transmitted from the online banking application (304) to the financial application of user A (310). As discussed above, user A may store login credentials for use by the financial application of user A (310) to periodically obtain financial transactions from the online banking application (304). The financial application of user A (310) may present the financial transaction A to user A for categorization based on the merchant (302) name.

In Step 324, categorized financial transaction A is transmitted from the financial application of user A (310) to the recategorization optimization system (306). In Step 326, the recategorization optimization system (306) transmits an alternative categorization for financial transaction A to the financial application of user A (310). The alternative categorization is determined based on recategorization indexes calculated based on the financial data from the financial applications of the user community (308). For example, the alternative categorization may be the recategorization value with the highest recategorization index, which indicates that the recategorization value was selected for a relative majority of recategorized financial transactions.

In Step 328, the alternative categorization for financial transaction A is presented to user A. For example, if user A initially categorized financial transaction A as "utilities" in Step 324, the alternative categorization may specify that financial transaction A should be categorized as "shopping."

In Step 330, user A's selection of the alternative categorization is transmitted from the financial application of user A (310) to the recategorization optimization system (306). The selection of the alternative categorization may then be used to update the recategorization indexes calculated in Step 318.

In Step 332, additional categorized financial transactions are transmitted from the financial applications of the user community (308) to the recategorization optimization system (306). The recategorization optimization (306) may continually obtain categorization data from the financial applications of the user community (308) for updating the recategorization indexes.

In Step 334, updated recategorization indexes may be determined. More specifically, the updated recategorization indexes may be calculated using the categorized financial transactions received in Step 316 and the additional categorized financial transactions received in Step 332. The updated recategorizations may then be used to determine an updated alternative categorization for financial transaction A.

In Step 336, the updated alternative recategorization is transmitted from the recategorization optimization system (306) to the financial application of user A (310). The financial application of user A (310) may then present the updated alternative categorization to user A.

Figure 4A:
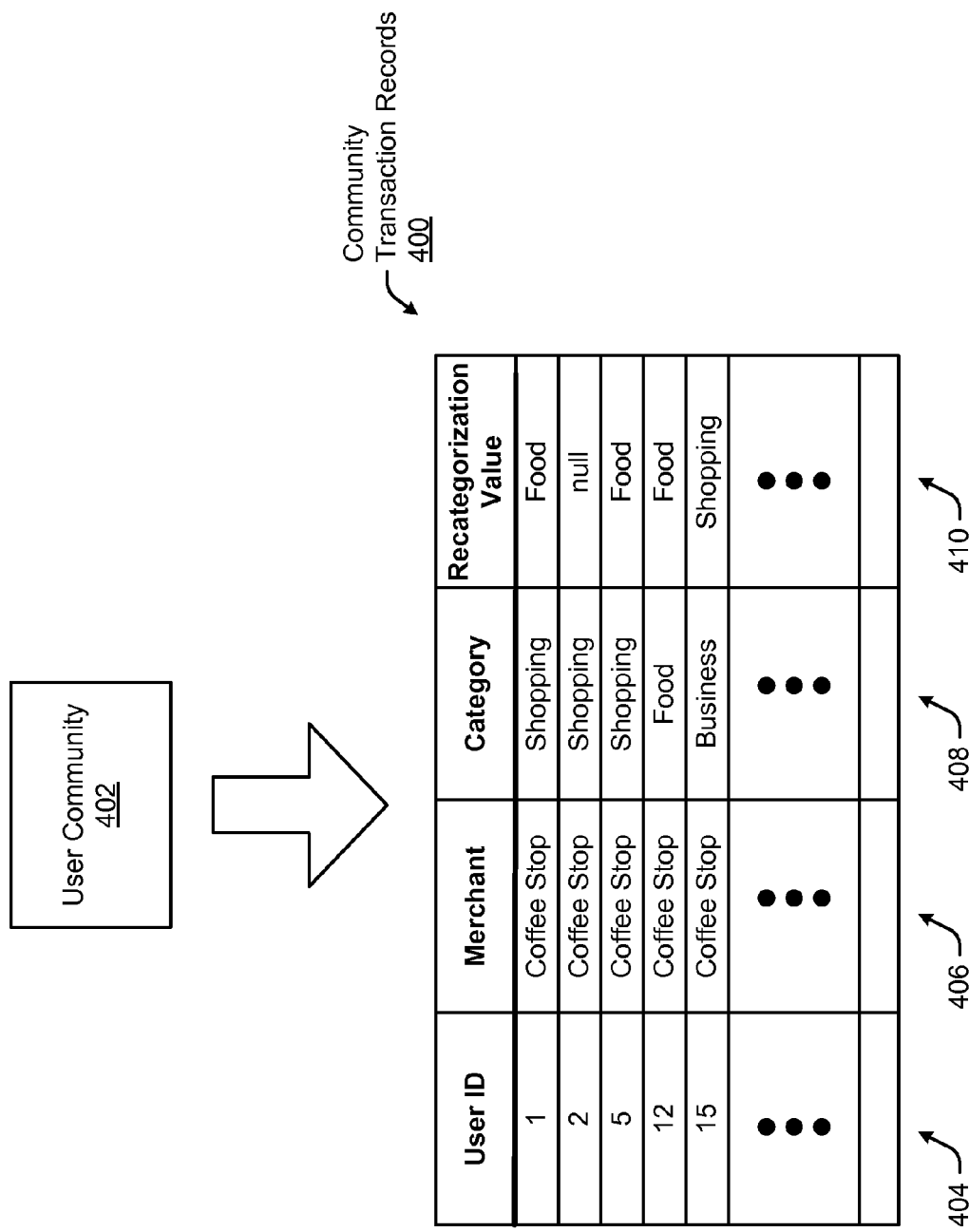
FIGS. 4A and 4B show an example in accordance with one or more embodiments of the invention.
Figure 4B:
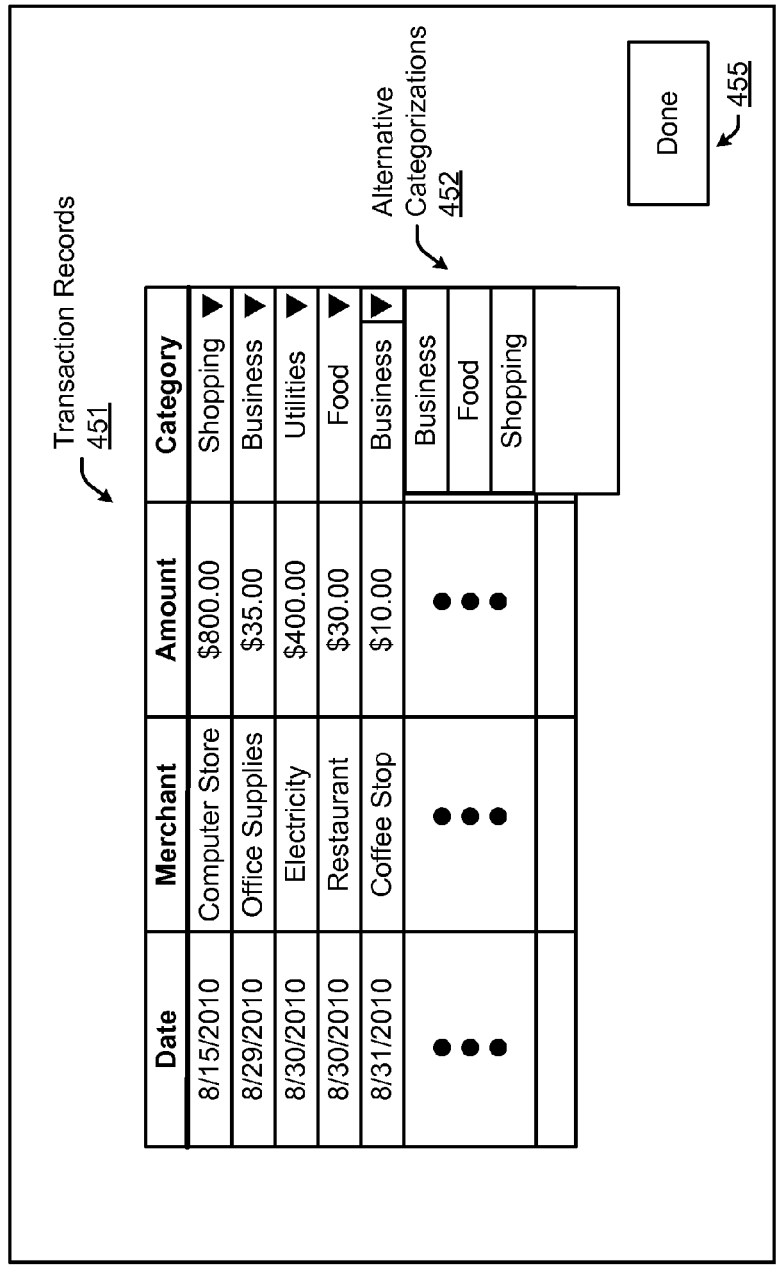

The following FIGS. 4A-4B show examples in accordance with one or more embodiments of the invention. The examples are not intended to limit the scope of the invention.

Referring to FIG. 4A, FIG. 4A shows an example of community transaction records (400) in accordance with one or more embodiments of the invention. The community transaction records (400) include data columns for user identification ("ID") (404), merchant (406), category (408), and recategorization value (410).

In one or more embodiments of the invention, the community transaction records (400) are obtained from a user community (402). For example, the community transaction records (400) may be obtained from financial applications of the members of the user community as discussed above with respect to FIGS. 2 and 3. Each of the community transaction records (400) is associated with a member of the user community (402) as shown in the user ID (404) data column. In this example, five community transaction records (400) are shown, where each record is associated with a different member of the user community (402).

Each of the five community transaction records (400) is associated with the "Coffee Stop" as shown in the merchant (406) data column. In other words, the community transaction records (400) may be used to calculate a recategorization index for financial transactions associated with the "Coffee Stop." Those skilled in the art will appreciate that any number of transaction records may be used to calculate a recategorization index for a merchant.

The category (408) data column shows the initial categories assigned to each of the community transaction records (400). In this example, the merchant "Coffee Stop" was assigned an initial category (408) of "shopping" three times, an initial category (408) of "food" one time, and an initial category (408) of "business" one time.

In addition, the merchant "Coffee Stop" was assigned a recategorization value (410) of "food" three times, a recategorization value (410) of "shopping" one time, and a recategorization value (410) of "null" one time. Accordingly, three of the community transaction records (400) were recategorized (i.e., not assigned a null recategorization value (410) and assigned a recategorization value (410) that is different from the initial category (408)) by the user community. In this example, there are two distinct recategorization values (410), "food" and "shopping." The recategorization index of each distinct recategorization value may be calculated as shown below in equations (2) and (3):

$$RI_{shopping} = \frac{count(RC_{shopping})}{count(all\ RC\ where\ RC\ !=\ C1\ and\ RC\ !=\ null)} = \frac{1}{3} \quad (2)$$

$$RI_{food} = \frac{count(RC_{food})}{count(all\ RC\ where\ RC\ !=\ C1\ and\ RC\ !=\ null)} = \frac{2}{3} \quad (3)$$

Referring to FIG. 4B, FIG. 4B shows an example of a transaction list user interface (450) in accordance with one or more embodiments of the invention. The toolbar includes transaction records (451), alternative categorizations (452) and a done button (455).

In one or more embodiments of the invention, the transaction list user interface (450) is presented in a financial application, which may be the same as the financial application described above with respect to FIGS. 1-3. In this example, each of the transaction records (451) includes a date, merchant name, amount, and category. The financial application may present the transaction list user interface (450) to allow a user to categorize the transaction records (451).

The alternative categories (452) are displayed when a user selects the drop-down box for the transaction record associated with the "Coffee Stop." Based on the recategorization indexes calculated above with respect to FIG. 4A, the alternative categorizations (452) show "business" as the current category, "food" as the primary alternative category, and "shopping" as the secondary alternative category. "Food" is shown as the primary alternative category because "food" has the highest categorization index, $\frac{2}{3}$ as calculated above with respect to FIG. 4A. Once the user has finished categorizing the transaction records (451), the done button (455) may be selected to save the changes and exit the transaction list user interface (450).

Those skilled in the art will appreciate that other configurations of user interfaces may be used to present alternative categories to the user. For example, the category column may be presented as a textbox with autocompletions that favor alternative categories.

Figure 5:
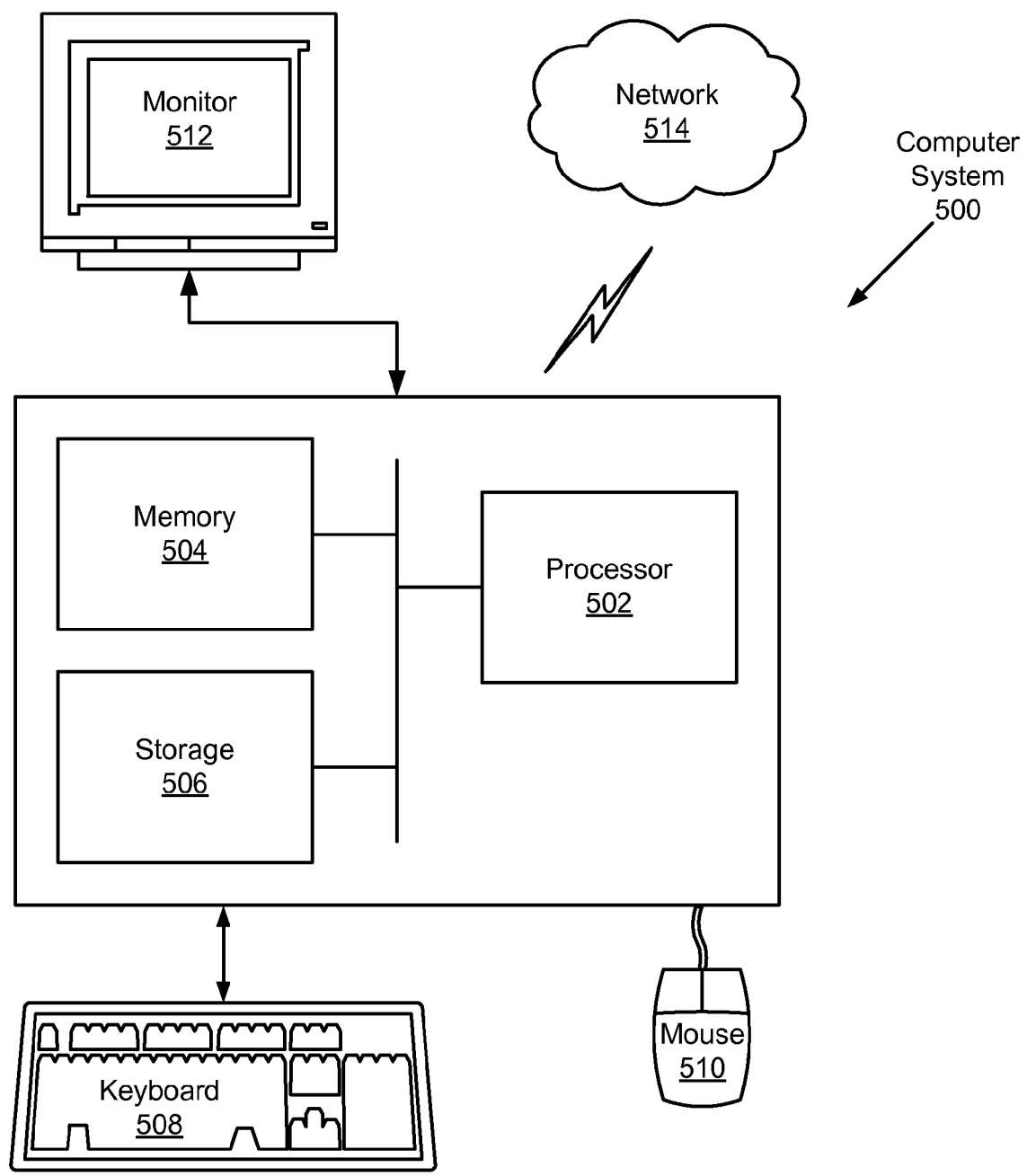
FIG. 5 shows a computer system in accordance with one or more embodiments of the invention.

Embodiments of the invention may be implemented on virtually any type of computer regardless of the platform being used. For example, as shown in FIG. 5, a computer system (500) includes one or more processor(s) (502) such as an integrated circuit, a central processing unit, or other hardware processor, associated memory (504) (e.g., random access memory (RAM), cache memory, flash memory, etc.), a storage device (506) (e.g., a hard disk, an optical drive such as a compact disk drive or digital video disk (DVD) drive, a flash memory stick, etc.), and numerous other elements and functionalities typical of today's computers (not shown). The computer (500) may also include input means, such as a keyboard (508), a mouse (510), or a microphone (not shown). Further, the computer (500) may include output means, such as a monitor (512) (e.g., a liquid crystal display (LCD), a plasma display, or cathode ray tube (CRT) monitor). The computer system (500) may be connected to a network (514) (e.g., a local area network (LAN), a wide area network (WAN) such as the Internet, or any other similar type of network) via a network interface connection (not shown). Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means may take other forms. Generally speaking, the computer system (500) includes at least the minimal processing, input, and/or output means necessary to practice embodiments of the invention.

Further, those skilled in the art will appreciate that one or more elements of the aforementioned computer system (500) may be located at a remote location and connected to the other elements over a network. Further, embodiments of the invention may be implemented on a distributed system having a plurality of nodes, where each portion of the invention (e.g., the donation management system, browser application) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a non-transitory computer readable storage medium such as a compact disc (CD), a diskette, a tape, or any other computer readable storage device.

While the invention has been described with respect to a limited number of embodiments, those skilled in the art, having benefit of this disclosure, will appreciate that other embodiments may be devised which do not depart from the scope of the invention as disclosed herein. Accordingly, the scope of the invention should be limited only by the attached claims.

What is claimed is:

1. A method for optimizing recategorization of financial transactions using collaborative filtering, comprising:
    obtaining a plurality of historical financial transactions of a plurality of users with a merchant, each of the plurality of historical financial transactions comprising user identification for one of the plurality of users, a merchant name of the merchant, an initial category assigned to each of the plurality of historical financial transactions, and a recategorization value of a plurality of recategorization values for each of the plurality of historical financial transactions, wherein the plurality of historical financial transactions occurred in the past;
    determining, using a processor, a first portion of the plurality of historical financial transactions assigned to each recategorization value of the plurality of recategorization values;
    determining, using the processor, a second portion of the plurality of historical financial transactions where the each recategorization value is different from the initial category;
    generating, using the processor, a recategorization index for the each recategorization value using:

$$RI_i = \frac{\text{count}(RC_i)}{\text{count}(\text{all } RC \text{ where } RC \mathrel{!}= C1 \text{ and } RC \mathrel{!}= \text{null})},$$

wherein $RI_i$ is the recategorization index, $RC_i$ is the first portion of the plurality of historical financial transactions, RC is the plurality of recategorization values, and C1 is the initial category assigned to each of the plurality of historical financial transactions;
    determining, using the processor, an alternative categorization candidate based on the recategorization index of the each recategorization value;
    assigning, based on the recategorization index exceeding a threshold, the alternative categorization candidate as a new initial category for a plurality of future financial transactions with the merchant; and
    maintaining the initial category assigned to each of the plurality of historical financial transactions.

2. The method of claim 1, further comprising:
    prior to generating the recategorization index for the each recategorization value, determining that the second portion exceeds a predetermined threshold.

3. The method of claim 1, wherein determining the alternative categorization candidate comprises:
    sorting the plurality of recategorization values in a user interface element based on the recategorization index for each of the plurality of recategorization values.

4. The method of claim 3, wherein the user interface element is a drop-down box, and wherein the plurality of recategorization values are sorted from highest to lowest recategorization index.

5. The method of claim 1, wherein the plurality of historical financial transactions are obtained from a plurality of financial applications of the plurality of users.

6. The method of claim 1, wherein the recategorization index specifies a candidate rank selected from a group consisting of a strong candidate, a potential candidate, and random noise.

7. The method of claim 6, wherein the candidate rank is determined based on a ratio of the first portion to the second portion.

8. A system for optimizing recategorization of financial transactions using collaborative filtering, comprising:
    a processor;
    a memory;
    an application interface stored on the memory for executing on the processor and configured to:
        obtain a plurality of historical financial transactions of a plurality of users with a merchant, each of the plurality of historical financial transactions comprising user identification for one of the plurality of users, a merchant name of the merchant, an initial category assigned to each of the plurality of historical financial transactions, and a recategorization value of a plurality of recategorization values for each of the plurality of historical financial transactions, wherein the plurality of historical financial transactions occurred in the past; and
    a recategorization optimization module stored on the memory for executing on the processor and configured to:
        determine a first portion of the plurality of historical financial transactions assigned to each recategorization value of the plurality of recategorization values;
        determine a second portion of the plurality of historical financial transactions where the each recategorization value is different from the initial category;
        generate a recategorization index for the each recategorization value using:

$$RI_i = \frac{\text{count}(RC_i)}{\text{count}(\text{all } RC \text{ where } RC \mathrel{!}= C1 \text{ and } RC \mathrel{!}= \text{null})},$$

wherein $RI_i$ is the recategorization index $RC_i$ is the first portion of the plurality of historical financial transactions, RC is the plurality of recategorization values, and C1 is the initial category assigned to each of the plurality of historical financial transactions;

determine an alternative categorization candidate based on the recategorization index of the each recategorization value;

assign, based on the recategorization index exceeding a threshold, the alternative categorization candidate as a new initial category for a plurality of future financial transactions with the merchant; and maintain the initial category assigned to each of the plurality of historical financial transactions.

9. The system of claim 8, wherein the recategorization optimization module is further configured to:

prior to generating the recategorization index for the each recategorization value, determine that the second portion exceeds a predetermined threshold.

10. The system of claim 8, wherein the recategorization optimization module is configured to determine the alternative categorization candidate by sorting the plurality of recategorization values in a user interface element based on the recategorization index for each of the plurality of recategorization values.

11. The system of claim 10, wherein the user interface element is a drop-down box, and wherein the plurality of recategorization values are sorted from highest to lowest recategorization index.

12. The system of claim 8, wherein the plurality of historical financial transactions are obtained from a plurality of financial applications of the plurality of users.

13. The system of claim 8, wherein the recategorization index specifies a candidate rank selected from a group consisting of a strong candidate, a potential candidate, and random noise.

14. The system of claim 13, wherein the candidate rank is determined based on a ratio of the first portion to the second portion.

15. A non-transitory computer readable storage medium, embodying instructions executable by the computer to perform method steps for optimizing recategorization of financial transactions using collaborative filtering, the instructions comprising functionality to:

obtain a plurality of historical financial transactions of a plurality of users with a merchant, each of the plurality of historical financial transactions comprising user identification for one of the plurality of users, a merchant name of the merchant, an initial category assigned to each of the plurality of historical financial transactions, and a recategorization value of a plurality of recategorization values for each of the plurality of historical financial transactions, wherein the plurality of historical financial transactions occurred in the past;

determine a first portion of the plurality of historical financial transactions assigned to each recategorization value of the plurality of recategorization values;

determine a second portion of the plurality of historical financial transactions where the each recategorization value is different from the initial category;

generate a recategorization index for the each recategorization value using:

$$RI_i = \frac{\text{count}(RC_i)}{\text{count(all } RC \text{ where } RC != C1 \text{ and } RC != \text{null})},$$

wherein $RI_i$ is the recategorization index $RC_i$ is the first portion of the plurality of historical financial transactions, RC is the plurality of recategorization values, and C1 is the initial category assigned to each of the plurality of historical financial transactions;

determine an alternative categorization candidate based on the recategorization index of the each recategorization value;

assign, based on the recategorization index exceeding a threshold, the alternative categorization candidate as a new initial category for a plurality of future financial transactions with the merchant; and maintain the initial category assigned to each of the plurality of historical financial transactions.

16. The non-transitory computer readable storage medium of claim 15, wherein the instructions further comprising functionality to:

prior to generating the recategorization index for the each recategorization value, determine that the second portion exceeds a predetermined threshold.

17. The non-transitory computer readable storage medium of claim 15, wherein the instructions when executed determine the alternative categorization by sorting the plurality of recategorization values in a user interface element based on the recategorization index for each of the plurality of recategorization values.

18. The non-transitory computer readable storage medium of claim 17, wherein the user interface element is a drop-down box, and wherein the plurality of recategorization values are sorted from highest to lowest recategorization index.

19. The non-transitory computer readable storage medium of claim 15, wherein the plurality of historical financial transactions are obtained from a plurality of financial applications of the plurality of users.

20. The non-transitory computer readable storage medium of claim 15, wherein the recategorization index specifies a candidate rank selected from a group consisting of a strong candidate, a potential candidate, and random noise.

21. The non-transitory computer readable storage medium of claim 20, wherein the candidate rank is determined based on a ratio of the first portion to the second portion.

22. The non-transitory computer readable storage medium of claim 20, wherein the candidate rank of random noise excludes the each recategorization value from being determined as the alternative categorization candidate.

* * * * *

UNITED STATES PATENT AND TRADEMARK OFFICE
CERTIFICATE OF CORRECTION

PATENT NO. : 8,538,967 B1  
APPLICATION NO. : 13/005462  
DATED : September 17, 2013  
INVENTOR(S) : David Junzi Wu et al.

It is certified that error appears in the above-identified patent and that said Letters Patent is hereby corrected as shown below:

In the Claims:

At column 12, claim number 8, line number 62, "wherein $RI_i$ is the recategorization index $RC_i$ is the" should read --wherein $RI_i$ is the recategorization index, $RC_i$ is the--.

At column 14, claim number 15, line number 9, "wherein $RI_i$ is the recategorization index $RC_i$ is the first" should read --wherein $RI_i$ is the recategorization index, $RC_i$ is the first--.

Signed and Sealed this
Seventeenth Day of June, 2014

Michelle K. Lee
*Deputy Director of the United States Patent and Trademark Office*